Patented Jan. 12, 1926.

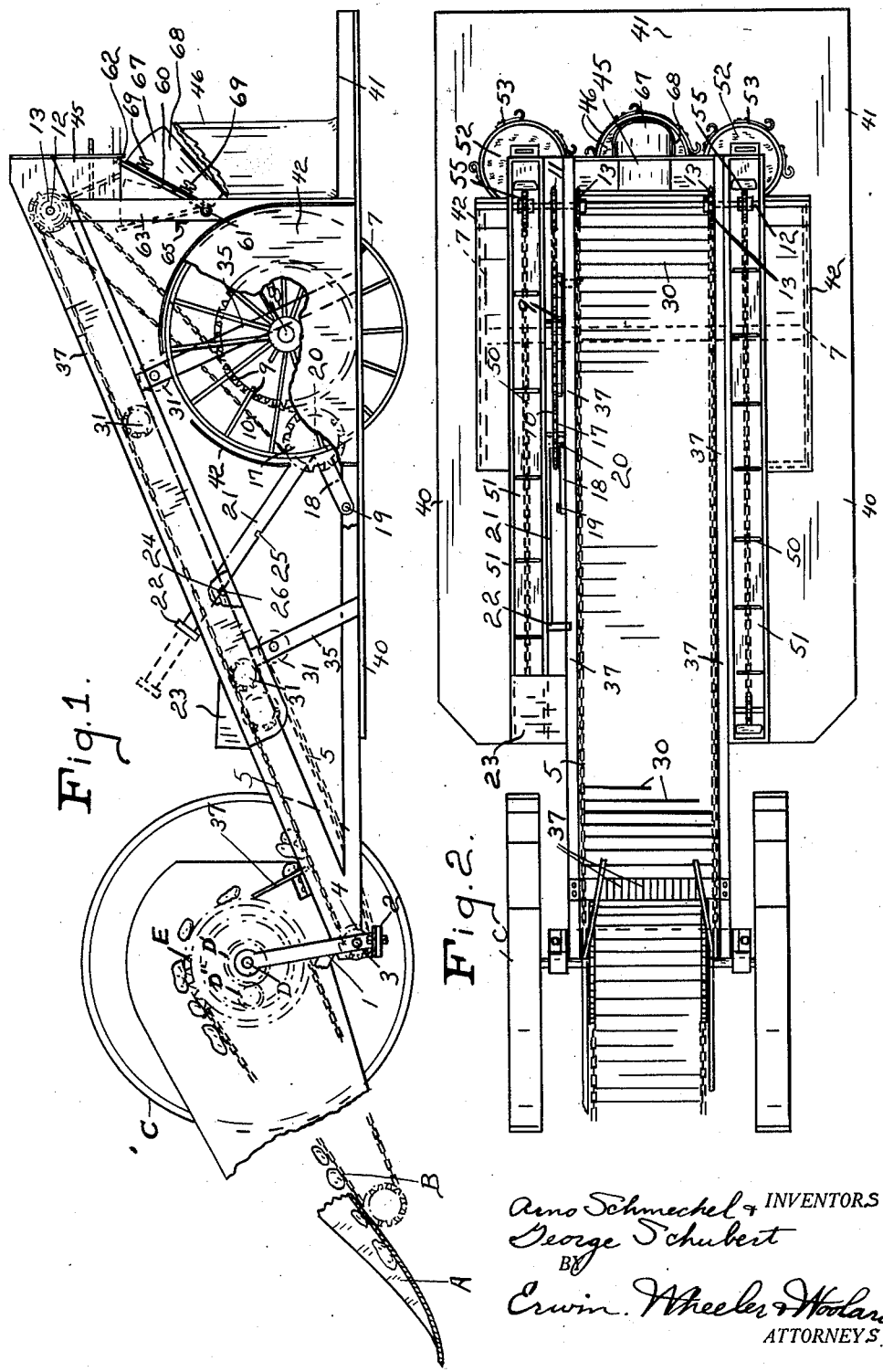

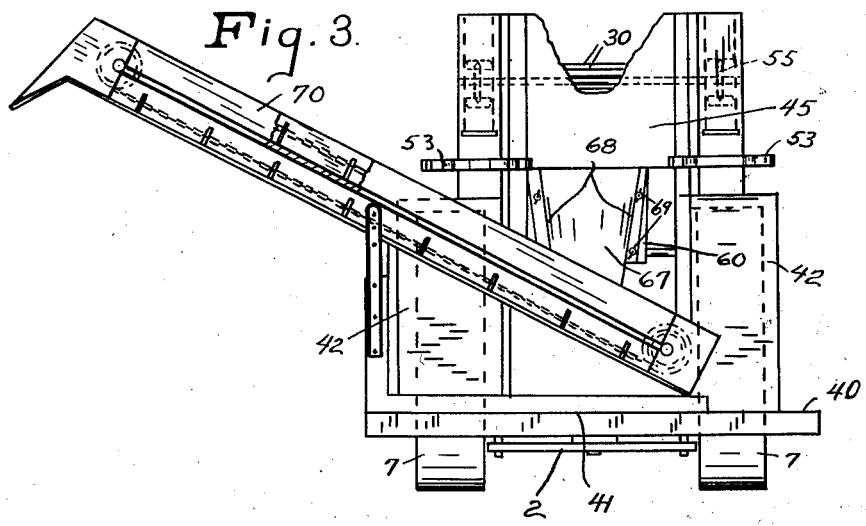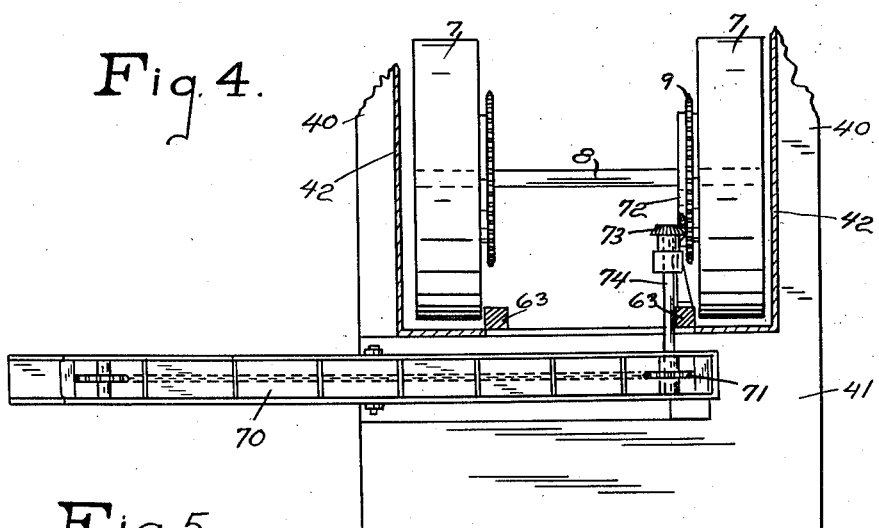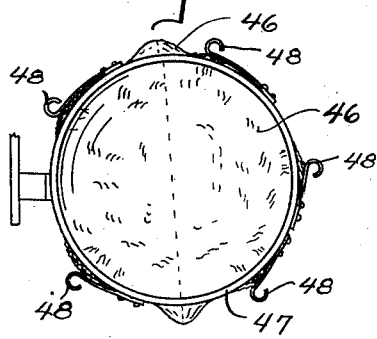

1,569,038

UNITED STATES PATENT OFFICE.

ARNO SCHMECHEL AND GEORGE SCHUBERT, OF THIENSVILLE, WISCONSIN.

POTATO-HARVESTER ATTACHMENT.

Application filed December 6, 1924. Serial No. 754,352.

*To all whom it may concern:*

Be it known that we, ARNO SCHMECHEL and GEORGE SCHUBERT, citizens of the United States, residing at Thiensville, county of Ozaukee, and State of Wisconsin, have invented new and useful Improvements in Potato-Harvester Attachments, of which the following is a specification.

Our invention relates to improvements in sorting, separating and packaging attachments for tuber and root diggers such, for example, as potato diggers.

The object of our invention is to provide convenient and effective means for sorting potatoes and similar materials from the earth and vines and packaging the potatoes or roots. Also to provide means whereby the sorting apparatus may be detachably connected with any potato harvester, or with a beet or carrot harvester, whereby the harvester may be used either independently or in connection with the sorter and separator as conditions may require.

Further objects of our invention are to provide means whereby the sorter and separator may be adapted for most efficient use in either a sandy soil or a clay soil; to provide means whereby the material to be harvested may be either packaged or delivered in bulk into a wagon to be drawn across the field at one side of the harvester; to provide means to facilitate the delivery of the harvested materials either into sacks or into boxes or receptacles of differing height; to provide improved driving and controlling mechanism; and in general, to provide a more efficient harvester of the described class than any of those which have been heretofore used.

In the drawings:

Figure 1 is a side elevation of a sorter and separator embodying our invention as it appears when attached to a potato digger, a portion of the latter being broken away.

Figure 2 is a plan view of the same with the digger plow omitted.

Figure 3 is a rear elevation of our improved sorting attachment with a lateral conveyor applied to the rear end thereof.

Figure 4 is a plan view of the same.

Figure 5 is a detail plan view of the bag holder.

The digger to which our invention is applied may be of any ordinary construction in which a shovel plow A lifts the material (earth and potatoes, or other tubers or roots) and delivers the material upon a conveyor B (preferably a chain conveyor provided with cross rods). The rear end of the conveyor is supported by wheels C having an axle D provided with sprocket wheels E journalled thereon and driven from the shaft D through gear wheels D', D''. The specific construction of the plow and its elevating conveyor is not material to the invention herein described and forms no part thereof, except as hereinafter described. Therefore, detailed illustration and description is deemed unnecessary.

The frame of the plow has a rearwardly extending portion 1 provided with a cross bar 2 which supports the bearings for the cross shaft 3 at the front end of the sorting and separating attachment. The cross shaft 3 is provided near each end with sprocket wheels 4 over which the conveyor chains 5 extend.

The rear end portion of the sorting and separating attachment is supported by a set of bull wheels 7 having an axle shaft 8 provided near one end with a driving sprocket wheel 9 which transmits motion to the conveyor chains 5 through the sprocket chain 10, sprocket wheel 11, shaft 12 and sprocket pinions 13, fast on the shaft 12, and over which the chains 5 travel. A sprocket chain 10 passes around an adjustable sprocket wheel 17 supported by links 18 from one of the side walls of the frame to which said links are pivoted at 19. The rear ends of the links support a journal 20 upon which the sprocket wheel 17 is mounted and this journal may be raised or lowered by means of a manually operated bar 21 having a handle 22 within reach of an operator who occupies the seat 23. The bar 21 is provided with notches 24 and 25, either one of which may be engaged with a stud 26 on the frame, whereby the bar 21 may be locked in either of two positions of adjustment. When the stud 26 is engaged in the notch 24, sprocket wheel 17 will occupy a position with the underside of sprocket chain 10 engaging the teeth of sprocket wheel 9. By lifting the bar 21 to disengage it from the stud 26 and then drawing it upwardly to the position indicated by dotted lines in Figure 1, sprocket wheel 17 will be lifted until its chain is out of engagement with the sprocket wheel 9, thereby disconnecting the power from the conveyor chains 5.

The conveyor chains 5 are connected by cross rods 30 which are spaced apart sufficiently to allow loose earth and sand to pass between them while retaining potatoes or other roots of sufficient size to be of any value. Idler sprockets 31, journalled to the sides of the frame at intervals, are adapted to prevent the conveyor chains from sagging materially. No floor is provided underneath the conveyor, the side walls affording sufficient support in connection with suitable braces 35. The material delivered from the plow by the elevating conveyor B is allowed to drop from the rear end of the conveyor B upon a series of downwardly and rearwardly inclined slats 37 along which the material slides to the lower end of the sorting conveyor composed of the chains 5 and cross rods 30. The material is then carried upwardly and rearwardly between the side walls 37 of the sorting conveyor frame. The sorting conveyor is preferably driven at a relatively slow speed as compared with the speed of the conveyor B and the frame of the sorter is provided with side platforms 40 and a rear platform 41, the platforms being connected and continuous along the sides and across the rear end. The bull wheels are covered by suitable housings 42 whereby operators may stand on either side of the machine and remove material from the sorting conveyor.

When operating in sandy soils, the sand will drop through between the rods 30 of the sorting conveyor and it will therefore be found convenient for the operators on the platforms 40 to remove vines and stones and drop them to the ground at the respective sides of the machine, leaving the larger potatoes upon the conveyor to be delivered thereby through a hopper 45 at the rear end of the conveyor into a sack 46 which may be clamped or otherwise secured to a sack holding frame or ring 47. In the construction shown in Figure 5, the spring loops 48 are secured to the ring 47 and adapted to engage the sack between them and said ring.

The smaller potatoes are removed by the operators from the sorting conveyor and dropped upon auxiliary conveyors 50 mounted in trough 51 exterior to the side walls 37. These auxiliary conveyors 50 deliver the small potatoes into sacks 52 similarly supported by sack holding frames 53. The specific structure of the auxiliary conveyors is not very material since the potatoes are delivered to these conveyors by hand. Ordinary belt conveyors may therefore be employed. They are actuated from the shaft 12 which is extended through the side walls 37 and provided with sprocket wheels 55.

When working in heavy clay soils in which lumps or clods of earth are lifted with the potatoes, it will be desirable to remove the potatoes from the conveyor instead of removing the vines and stones as above described. In that event it will be desirable to pick out the marketable potatoes and allow the sorting conveyor to deliver the other material over its rear end. To prevent such material from falling upon the rear portion 41 of the platform, a swinging gate 60 is employed. This gate is pivoted at 61 to the machine frame and its upper end is adapted to swing against a stop 62, as shown in Figure 1, whereupon any material delivered over the rear end of the sorting conveyor will be directed downwardly and forwardly between the posts 63 at the rear end of the frame and allowed to drop to the ground in front of the portion 41 of the platform. When not in use, this gate 60 may be swung forwardly to the dotted line position in which it is shown in Figure 1, whereupon it will be supported by a bracket or stop 65. This is the position which the gate occupies when potatoes are being delivered into the sacks directly from the sorting conveyor.

It is sometimes desirable to deliver the potatoes into boxes or crates instead of delivering them into sacks. Therefore we provide the rear face of the gate 60 with an auxiliary detachable hopper 67 open at the top and bottom and provided with side walls 68 which converge. When the gate is in the position of non-use indicated by dotted lines in Figure 1, it inclines downwardly and rearwardly and the potatoes carried by the sorting conveyor will therefore be directed through the open hopper 67 downwardly into a crate or box resting upon the platform 41. These boxes may be removed when filled and empty boxes substituted, preferably by an attendant who walks at the side of the machine. Platform 41 is only a short distance above the ground and such an attendant can therefore easily remove the filled boxes and substitute empty ones. When the vegetables are to be received in sacks, the hopper 68 may be removed by unscrewing the thumb nuts 69.

Considerable importance is attached to the fact that our improved sorting and separating apparatus is provided with an inclined sorting conveyor which is adapted to receive and elevate the material to be sorted and separated from a point below the delivery end of the digging mechanism comprising the plow A and conveyor B. The material lifted by the plow A and conveyor B is dropped upon the slide bars 37 and substantially all the loose earth and all lumps or clods which can be easily broken will separate sufficiently upon striking the bars 37 to pass through, while the potatoes, other tubers, or roots will slide downwardly to the conveyor bars 30. When the materials strike these bars 30, lumps of earth which have not passed between the bars 37 will in many cases be additionally broken and caused to pass between the bars 30, thereby making it possible to eliminate practically all of the earth except in cases where the soil is wet and sticky or where a clay soil is unusually hard and lumpy. Owing to the fact that the bars 37 extend longitudinally of the line of feed, the friction of the material thereon aids in the separation of the earth from the other materials and by the change in the direction of movement when the sorting conveyor is reached, whereby the downward movement is changed to an upward movement, an additional separating action is secured. It will of course be understood that there is comparatively little tendency for shaking out earth from between the transverse rods 30, although the movement of the apparatus over the ground jars the material on the conveyor sufficiently to cause loose material to pass between the rods if sufficiently divided.

It is sometimes desirable to deliver the potatoes laterally into a wagon at the side of the harvesting machine. In that event a lateral conveyor 70 may be employed. This conveyor may comprise an ordinary belt conveyor having a driving sprocket 71 which is driven from the bull wheels 7 through the bevel gear wheel 72 fast on sprocket wheel 9, pinion 73, and shaft 74 upon which the conveyor sprocket 71 is secured. When this attachment is employed, it will of course be understood that the vines, stones and small potatoes will be removed from the sorting conveyor, leaving only the merchantable potatoes to be delivered to the auxiliary conveyor 70.

We claim:

1. In a device of the character described, the combination with a wheeled frame having a support adapted to sustain receptacles to be filled and an opening leading to the ground at one side thereof, of a conveyor operable to carry material in the direction of said support, and a chute arranged to receive material from said conveyor whereby to be adapted to fill a container carried by said support, said chute comprising a hollow deflector provided with enclosing walls and adjustable with reference to the path of material delivered by said conveyor and adapted in one position of adjustment to receive such material therethrough and in another position to oppose the outside surface of one of its walls to such material in a direction to deflect such material into said opening, whereby said conveyor and chute may be employed for handling either desired or undesired material.

2. In a device of the character described, the combination with a frame and sorting conveyor mounted thereon, of a pair of auxiliary conveyors laterally adjacent the sorting conveyor on either side thereof, means for removably supporting receptacles in positions to receive material from each of the aforesaid conveyors, and a deflector associated with one of said conveyors and adapted in one position to guide material therefrom into one of said containers and in another position to deflect material therefrom away from said container.

3. In a harvester for potatoes and other vegetables, the combination with a sorting conveyor, of means for supporting receptacles in a position to receive material from the sorting conveyor, and an adjustable gate adapted in one position to direct such materials into receiving receptacles and in another position to direct material delivered by the conveyor to the ground.

4. In a harvester for potatoes and other vegetables, the combination with a sorting conveyor, of means for supporting receptacles in a position to receive material from the sorting conveyor, and an adjustable gate adapted in one position to direct such materials into receiving receptacles and in another position to direct material delivered by the conveyor to the ground, said gate having a detachable hopper on its rear face adapted to direct material convergingly into a receptacle when the gate is in packaging position.

5. In a harvesting machine for potatoes and other vegetables, the combination with a sorting conveyor, of a platform below the delivery end of the conveyor, means for directing material delivered by the conveyor downwardly toward the platform, and a swinging gate adapted in one position to direct material downwardly to the ground in front of the platform and in another position to direct material downwardly into a receptacle above the platform.

6. In a harvester for potatoes and other vegetables, the combination with a sorting conveyor, of a laterally operable conveyor adapted to receive material from the sorting conveyor and to elevate such material to a raised point of delivery at one side of the path along which the harvesting machine travels, said lateral conveyor being removable and said harvesting machine having means for supporting receptacles in a position to receive material which would otherwise be received by said lateral conveyor.

7. In a harvester for potatoes and other vegetables, the combination with a sorting conveyor, of a laterally operable conveyor adapted to receive material from the sorting conveyor and to elevate such material to a raised point of delivery at one side of the path along which the harvesting machine travels, said lateral conveyor being removable and said harvesting machine having means for supporting receptacles in a position to receive material which would otherwise be received by said lateral conveyor, together with a gate adapted in one position to deflect material from the sorting conveyor to the ground.

ARNO SCHMECHEL.
GEORGE SCHUBERT.